US012510911B2

(12) United States Patent
Cheng et al.

(10) Patent No.: US 12,510,911 B2
(45) Date of Patent: Dec. 30, 2025

(54) BANDGAP VOLTAGE REFERENCE CORE CIRCUIT, BANDGAP VOLTAGE REFERENCE SOURCE AND SEMICONDUCTOR MEMORY

(71) Applicant: CHANGXIN MEMORY TECHNOLOGIES, INC., Hefei (CN)

(72) Inventors: Weijie Cheng, Hefei (CN); Onegyun Na, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 386 days.

(21) Appl. No.: 18/166,040

(22) Filed: Feb. 8, 2023

(65) Prior Publication Data

US 2023/0280777 A1 Sep. 7, 2023

(30) Foreign Application Priority Data

Mar. 7, 2022 (CN) ........................ 202210217565.X

(51) Int. Cl.
*G05F 3/24* (2006.01)
*G05F 1/567* (2006.01)
*G05F 3/26* (2006.01)

(52) U.S. Cl.
CPC .............. *G05F 3/245* (2013.01); *G05F 1/567* (2013.01); *G05F 3/265* (2013.01)

(58) Field of Classification Search
CPC .......... G05F 1/567; G05F 3/245; G05F 3/247; G05F 3/26; G05F 3/262; G05F 3/265; G05F 3/267; G05F 3/30
See application file for complete search history.

(56) References Cited

U.S. PATENT DOCUMENTS 11,543,847 B2 * 1/2023 Wu ........................... G05F 3/30
11,797,040 B2 * 10/2023 Park ........................ G05F 3/267
(Continued)

FOREIGN PATENT DOCUMENTS

CN 102622031 A 8/2012
CN 102722205 A 10/2012
(Continued)

OTHER PUBLICATIONS

First Office Action of the Chinese application No. 202210217565.X, issued on Jul. 6, 2023. 10 pages with English abstract.
(Continued)

*Primary Examiner* — Thienvu V Tran
*Assistant Examiner* — Gabriel Alexander Rurycz
(74) *Attorney, Agent, or Firm* — Syncoda LLC; Feng Ma

(57) ABSTRACT

A bandgap voltage reference core circuit includes: a generating circuit, a first voltage dividing circuit and a second voltage dividing circuit. The generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage. The first voltage dividing circuit is connected to the generating circuit and the second voltage dividing circuit respectively, and is configured to generate an initial current based on the positive temperature coefficient current and the negative temperature coefficient current. The second voltage dividing circuit is configured to determine a reference voltage based on the initial current. The first voltage dividing circuit and the second voltage dividing circuit affect a voltage dividing proportion of the reference voltage.

15 Claims, 10 Drawing Sheets

(56) References Cited

U.S. PATENT DOCUMENTS

| | | | |
|---|---|---|---|
| 2006/0290415 | A1 | 12/2006 | Hazucha |
| 2014/0354259 | A1 | 12/2014 | Ding |
| 2018/0331614 | A1 | 11/2018 | Summer |

FOREIGN PATENT DOCUMENTS

| | | | |
|---|---|---|---|
| CN | 102841629 | A | 12/2012 |
| CN | 103197716 | A | 7/2013 |
| CN | 104035471 | A | 9/2014 |
| CN | 108037791 | A | 5/2018 |
| CN | 207882791 | U | 9/2018 |
| CN | 111045470 | A | 4/2020 |
| CN | 111064453 | A | 4/2020 |
| CN | 113703511 | A | 11/2021 |
| CN | 113778162 | A | 12/2021 |
| CN | 215340874 | U | 12/2021 |
| CN | 114637363 | A | 6/2022 |
| CN | 114740937 | A | 7/2022 |

OTHER PUBLICATIONS

First Office Action of the Chinese application No. 202210216734.8, issued on Jul. 6, 2023. 9 pages with English abstract.
First Office Action of the Chinese application No. 202210216730.X, issued on Jul. 6, 2023. 8 pages with English abstract.

* cited by examiner

BANDGAP VOLTAGE REFERENCE CORE CIRCUIT, BANDGAP VOLTAGE REFERENCE SOURCE AND SEMICONDUCTOR MEMORY

CROSS-REFERENCE TO RELATED APPLICATION

This application claims priority to Chinese Patent Application No. 202210217565.X, filed on Mar. 7, 2022, the disclosure of which is hereby incorporated herein by reference in its entirety.

BACKGROUND

Bandgap voltage reference, often referred to as bandgap, is a temperature-independent reference voltage, which is about 1.25 V and obtained by adding a voltage with a positive temperature coefficient and a voltage with a negative temperature coefficient in a certain proportion so that the two temperature coefficients cancel each other out. Because the reference voltage is similar to the bandgap voltage of silicon, it is called bandgap voltage reference.

A reference voltage output by a traditional bandgap voltage reference source is not adjustable, so its range of use is limited; besides, its current mirror has a matching error, which affects its performance.

SUMMARY

The present disclosure relates to, but is not limited to, a bandgap voltage reference core circuit, a bandgap voltage reference source and a semiconductor memory.

In view of the above, embodiments of the present disclosure provide a bandgap voltage reference core circuit, a bandgap voltage reference source and a semiconductor memory, which can adjust an output reference voltage and expand the range of use.

Technical solutions of the embodiments of the present disclosure are implemented as follows.

The embodiments of the present disclosure provide a bandgap voltage reference core circuit, which may include: a generating circuit, a first voltage dividing circuit and a second voltage dividing circuit. The generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage. The first voltage dividing circuit is connected to the generating circuit and the second voltage dividing circuit respectively, and is configured to generate an initial current based on the positive temperature coefficient current and the negative temperature coefficient current. The second voltage dividing circuit is configured to determine a reference voltage based on the initial current; the first voltage dividing circuit and the second voltage dividing circuit affect a voltage dividing proportion of the reference voltage; and the reference voltage has a first-order zero temperature drift coefficient.

The embodiments of the present disclosure also provide a bandgap voltage reference source, which may include a bandgap voltage reference core circuit including a generating circuit, a first voltage dividing circuit and a second voltage dividing circuit. The generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage. The first voltage dividing circuit is connected to the generating circuit and the second voltage dividing circuit respectively, and is configured to generate an initial current based on the positive temperature coefficient current and the negative temperature coefficient current. The second voltage dividing circuit is configured to determine a reference voltage based on the initial current, where the first voltage dividing circuit and the second voltage dividing circuit affect a voltage dividing proportion of the reference voltage, and the reference voltage has a first-order zero temperature drift coefficient

DETAILED DESCRIPTION

Figure 1:
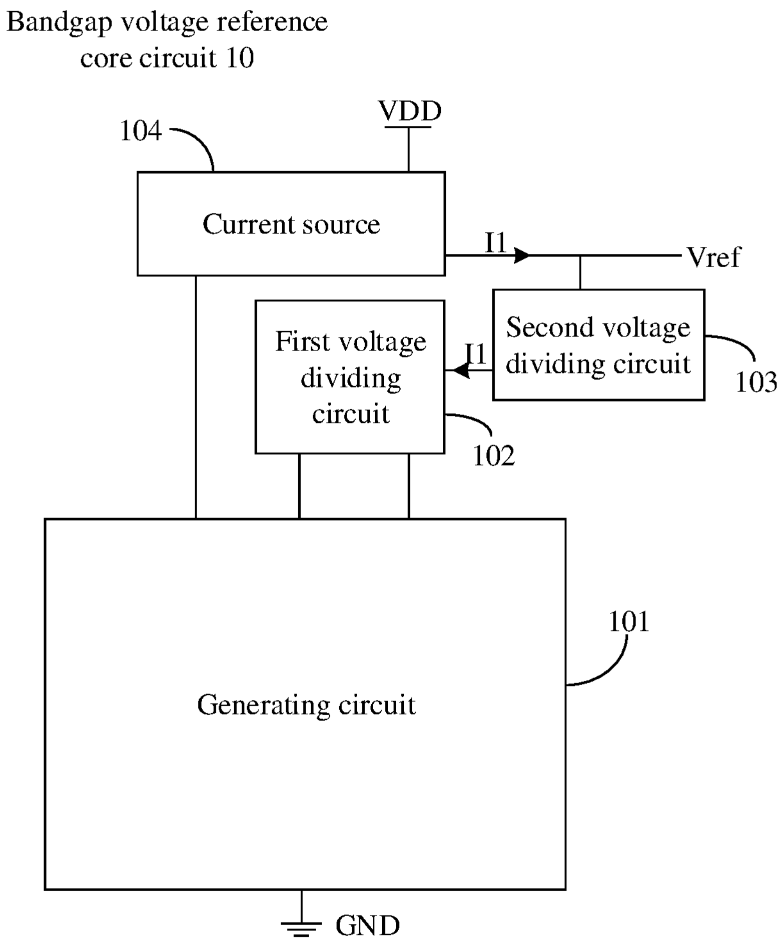
FIG. 1 is a first structural diagram of a bandgap voltage reference core circuit provided by an embodiment of the present disclosure.

For making the objectives, technical solutions and advantages of the disclosure clearer, the technical solutions of the disclosure will further be elaborated below in combination with the drawings and embodiments in detail. The described embodiments should not be considered as limits to the disclosure. All other embodiments obtained by those of ordinary skill in the art without creative work shall fall within the scope of protection of the disclosure.

"Some embodiments" involved in the following descriptions describes a subset of all possible embodiments. However, it can be understood that "some embodiments" may be the same subset or different subsets of all the possible embodiments, and may be combined without conflicts.

If a similar description of "first/second" appears in the application document, the following descriptions are added. In the following descriptions, term "first/second/third" involved is only for distinguishing similar objects and does not represent a specific sequence of the objects. It can be understood that "first/second/third" may be interchanged to specific sequences or orders if allowed to implement the embodiments of the application described herein in orders except the illustrated or described ones.

Unless otherwise defined, all technical and scientific terms in the specification have the same meaning as those skilled in the art, belonging to the present disclosure, usually understand. Terms used in the specification are only used for describing the purpose of the embodiments of the present disclosure, but not intended to limit the present disclosure.

The output voltage of the traditional bandgap voltage reference source can only be 1.2 V. The input voltage must be higher than 1.4 V, and the output voltage is not adjustable, so the traditional bandgap voltage reference source is not suitable for use in a case where an output voltage less than or greater than 1.2 V is required. Meanwhile, a current mirror of the traditional bandgap voltage reference source is composed of transistors, however, the structure of the transistors is complex, and it is difficult to accurately control the electrical characteristics in the manufacturing process. Therefore, the current mirror of the traditional bandgap voltage reference source is prone to a matching error, which affects its performance.

The embodiments of the present disclosure provide a bandgap voltage reference core circuit, a bandgap voltage reference source, and a semiconductor memory. The bandgap voltage reference core circuit includes: a generating circuit, a first voltage dividing circuit and a second voltage dividing circuit. The generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage. The first voltage dividing circuit is connected to the generating circuit and the second voltage dividing circuit respectively, and is configured to generate an initial current based on the positive temperature coefficient current and the negative temperature coefficient current. The second voltage dividing circuit affects a voltage dividing proportion and is configured to determine the reference voltage based on the initial current. The reference voltage has a first-order zero temperature drift coefficient. Because the first voltage dividing circuit and the second voltage dividing circuit affect the voltage dividing proportion of the reference voltage, the reference voltage can be adjusted by adjusting the first voltage dividing circuit and the second voltage dividing circuit, so that the reference voltage Vref is not limited to 1.2 V. Compared with the traditional bandgap voltage reference source, the reference voltage output by the embodiments of the present disclosure is greater than 1.2 V, which expands the range of the output reference voltage, that is, expands the range of use of the bandgap voltage reference source.

FIG. 1 is a structural diagram of a bandgap voltage reference core circuit provided by an embodiment of the present disclosure. As shown in FIG. 1, the embodiments of the present disclosure provide a bandgap voltage reference core circuit 10, which may include: a generating circuit 101, a first voltage dividing circuit 102, and a second voltage dividing circuit 103.

The generating circuit 101 is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage.

The first voltage dividing circuit 102 is connected to the generating circuit 101 and the second voltage dividing circuit 103 respectively, and is configured to generate an initial current I1 based on the positive temperature coefficient current and the negative temperature coefficient current.

The second voltage dividing circuit 103 is configured to determine a reference voltage Vref based on the initial current I1. The first voltage dividing circuit 102 and the second voltage dividing circuit 103 affect a voltage dividing proportion of the reference voltage Vref. The reference voltage Vref has a first-order zero temperature drift coefficient.

In the embodiments of the present disclosure, the first voltage dividing circuit 102 is also connected to a power end VDD, and the generating circuit 101 is also connected to a ground end GND.

The positive temperature coefficient current generated by the generating circuit 101 is positively correlated with the temperature, that is, the higher the temperature, the greater its value. The negative temperature coefficient current generated by the generating circuit 101 is negatively correlated with temperature, that is, the higher the temperature, the smaller its value. The reference voltage Vref cancel outs the positive and negative temperature coefficients and has a first-order zero temperature drift coefficient, that is, the first-order coefficient of reference voltage-temperature function is zero.

The second voltage dividing circuit 103 is connected to the output end of the reference voltage Vref. The first voltage dividing circuit 102 and the second voltage dividing circuit 103 can affect the voltage dividing proportion of the reference voltage Vref. Therefore, the reference voltage Vref can be adjusted by adjusting the first voltage dividing circuit 102 and the second voltage dividing circuit 103.

It is understandable that, because the second voltage dividing circuit 103 affects the voltage dividing proportion of the reference voltage Vref, the reference voltage Vref can be adjusted by adjusting the first voltage dividing circuit 102 and the second voltage dividing circuit 103, so that the reference voltage Vref is not limited to 1.2 V. Compared with the traditional bandgap voltage reference source, the reference voltage output by the embodiments of the present disclosure is greater than 1.2 V, which expands the range of the output reference voltage, that is, expands the range of use of the bandgap voltage reference source.

Figure 2:
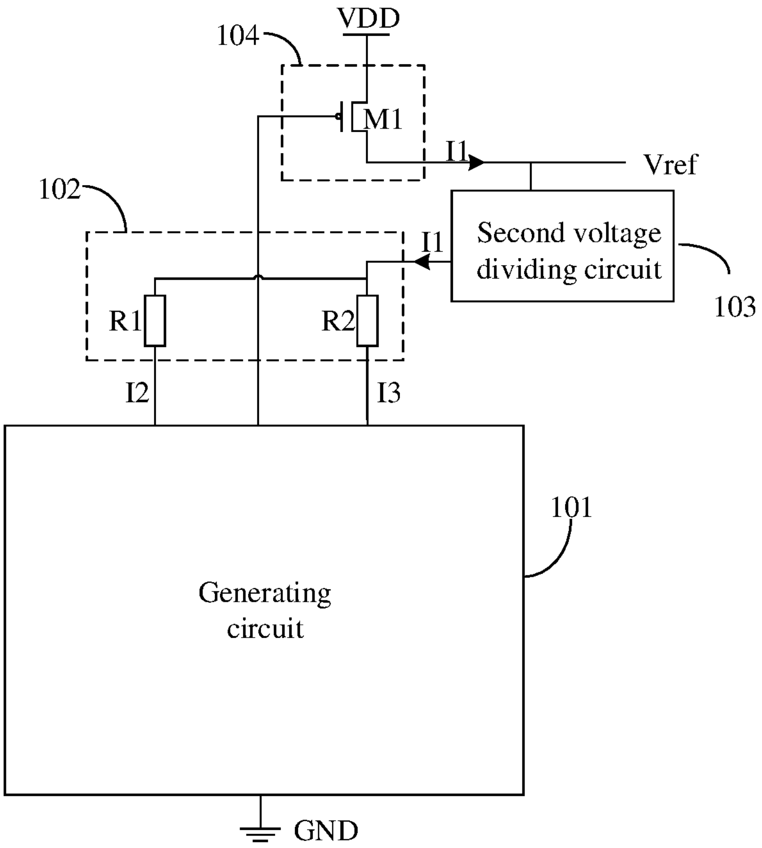
FIG. 2 is a second structural diagram of a bandgap voltage reference core circuit provided by an embodiment of the present disclosure.

In some embodiments of the present disclosure, as shown in FIG. 2, the first voltage dividing circuit 102 may include: a first resistor R1 and a second resistor R2; the bandgap voltage reference core circuit 10 may also include a current source 104; the current source 104 may include: an MOSFET M1.

A gate of the MOSFET M1 is connected to the generating circuit 101, and a first source/drain of the MOSFET M1 is connected to the power end VDD. The first end of the first resistor R1 is connected to the first end of the second resistor R2, and then the first ends are connected to a second source/drain of the MOSFET M1 via the second voltage dividing circuit 103. The second end of the first resistor R1 and the second end of the second resistor R2 are respectively connected to the generating circuit 101.

In the embodiments of the present disclosure, a ratio of a resistance value of the first resistor R1 to a resistance value of the second resistor R2 may be 1:1, that is, R1 is equal to R2; in this case, because the resistance values of the first resistor R1 and the second resistor R2 are equal, the current I2 on the first resistor R1 is equal to the current I3 on the second resistor R2, that is, 12 is equal to 13. The initial current I1 satisfies the following formula:

$$I1=I2+I3=2I3 \quad (1).$$

It is to be noted that the MOSFET M1 shown in FIG. 2 is a PMOS transistor, its first source/drain is connected to the power end VDD, and the gate voltage is less than the voltage of the first source/drain (in the circuit, the voltage of the power end VDD is the highest, and other positions have different degrees of voltage drop), therefore, its gate-source voltage Vgs is less than 0, and can reach the turn-on voltage of the PMOS transistor. Thus, the MOSFET M1 can be turned on.

The MOSFET may also be an NMOS transistor, and the bandgap voltage reference core circuit may be adjusted and transformed accordingly, for example, the power end VDD as the object connected to the first source/drain of the PMOS transistor is adjusted to the ground end GND. The above transformations should fall within the scope of protection of the present disclosure.

It is understandable that the first resistor R1 and the second resistor R2 are used to form the first voltage dividing circuit 102, which can precisely control the electrical characteristics and make the current I2 on the first resistor R1 equal to the current I3 on the second resistor R2 by using the equal resistance. Thus, a mirror error existing in the traditional bandgap voltage reference source can be eliminated to improve the performance.

Figure 3:
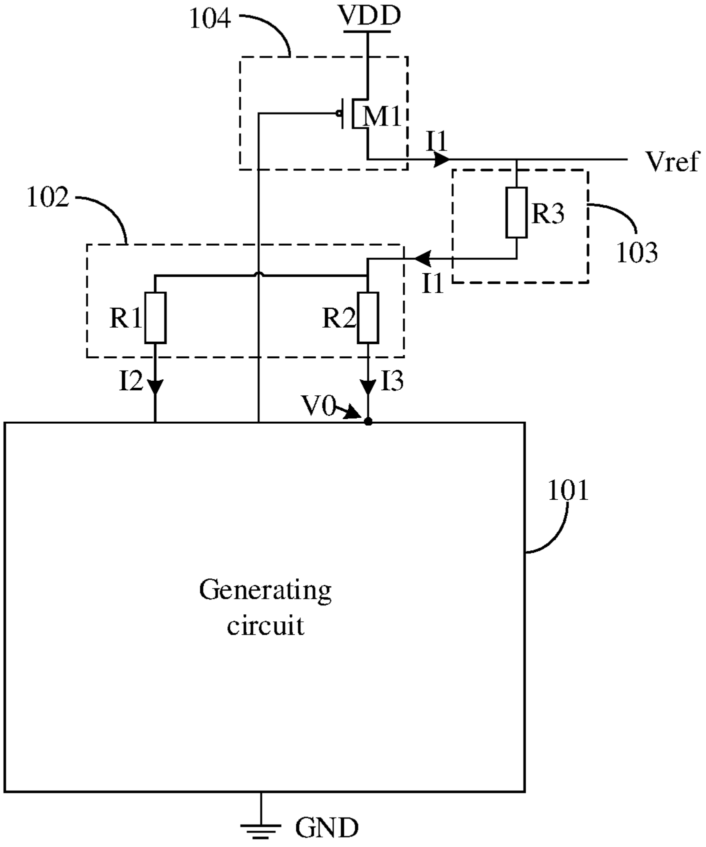
FIG. 3 is a third structural diagram of a bandgap voltage reference core circuit provided by an embodiment of the present disclosure.

In some embodiments of the present disclosure, as shown in FIG. 3, the second voltage dividing circuit 103 may include: a third resistor R3.

A first end of the third resistor R3 is connected to the second source/drain of the MOSFET M1. The first end of the first resistor R1 and the first end of the second resistor R2 are both connected to a second end of the third resistor R3.

In the embodiments of the present disclosure, the reference voltage Vref can be obtained by adding the voltage of two ends of the second resistor R2 and the voltage of two ends of the third resistor R3 to the potential V0 of the second end of the second resistor R2, that is, the reference voltage Vref satisfies the following formula:

$$Vref=V0+I3*R2+*I1*R3 \quad (2).$$

That is, the voltage of two ends of the second resistor R2 and the voltage of two ends of the third resistor R3 may form a part of the reference voltage Vref, thus affecting the reference voltage Vref.

It is understandable that because the voltage of two ends of the second resistor R2 and the voltage of two ends of the third resistor R3 form a part of the reference voltage Vref, the reference voltage Vref can be adjusted by adjusting the second resistor R2 and the third resistor R3, so that the reference voltage Vref is not limited to 1.2 V. Compared with the traditional bandgap voltage reference source, the reference voltage output by the embodiments of the present disclosure is greater than 1.2 V, which expands the range of the output reference voltage, that is, expands the range of use of the bandgap voltage reference source.

Figure 4:
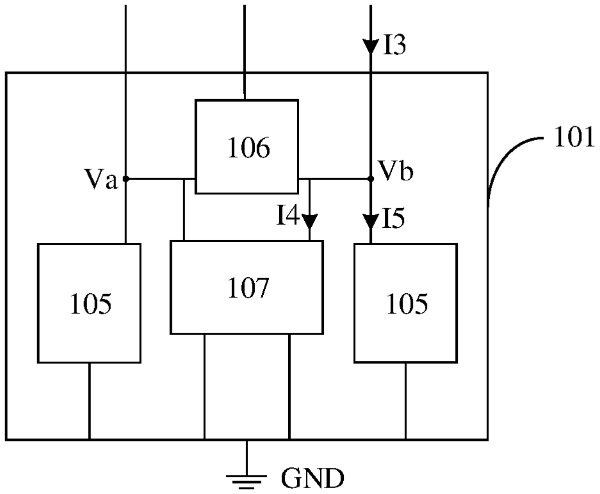
FIG. 4 is a fourth structural diagram of a bandgap voltage reference core circuit provided by an embodiment of the present disclosure.

In some embodiments of the present disclosure, as shown in FIG. 4, the generating circuit 101 may include: a current dividing circuit 105, a voltage limiting circuit 106, and a voltage generating circuit 107. The voltage generating circuit 107 and the current dividing circuit 105 are both connected to the voltage limiting circuit 106.

The voltage limiting circuit 106 is configured to provide a first clamping voltage Va and a second clamping voltage Vb. The first clamping voltage Va is equal to the second clamping voltage Vb.

The voltage generating circuit 107 is configured to generate the positive temperature coefficient voltage and the negative temperature coefficient voltage based on the first clamping voltage Va and the second clamping voltage Vb, and obtain the positive temperature coefficient current based on the positive temperature coefficient voltage.

The current dividing circuit 105 is configured to obtain the negative temperature coefficient current based on the negative temperature coefficient voltage.

In the embodiments of the present disclosure, the voltage limiting circuit 106 provides fixed voltages, namely the first clamping voltage Va and the second clamping voltage Vb. The voltage generating circuit 107 generates the positive temperature coefficient voltage and the negative temperature coefficient voltage based on the first clamping voltage Va and the second clamping voltage Vb. The voltage generating circuit 107 may generate the positive temperature coefficient current I4 based on the positive temperature coefficient voltage. The current dividing circuit 105 may generate the negative temperature coefficient current I5 based on the negative temperature coefficient voltage.

The sum of the positive temperature coefficient current I4 and the negative temperature coefficient current I5 is current I3, and there is a proportional relationship between the current I3 and the initial current I1, and the proportional relationship may be controlled by adjusting the first voltage dividing circuit 102. Therefore, the positive temperature coefficient current I4, the negative temperature coefficient current I5, and even the initial current I1 can be adjusted by adjusting the voltage generating circuit 107 and the current dividing circuit 105, and then the reference voltage Vref can be adjusted.

It is understandable that, in the case that the voltage limiting circuit fixes the clamping voltage, the output reference voltage may be adjusted through the voltage generating circuit and the current dividing circuit, so that the output reference voltage is not limited to 1.2 V. Compared with the traditional bandgap voltage reference source, the embodiments of the present disclosure expand the range of the output reference voltage, that is, expand the range of use of the bandgap voltage reference source.

Figure 5:
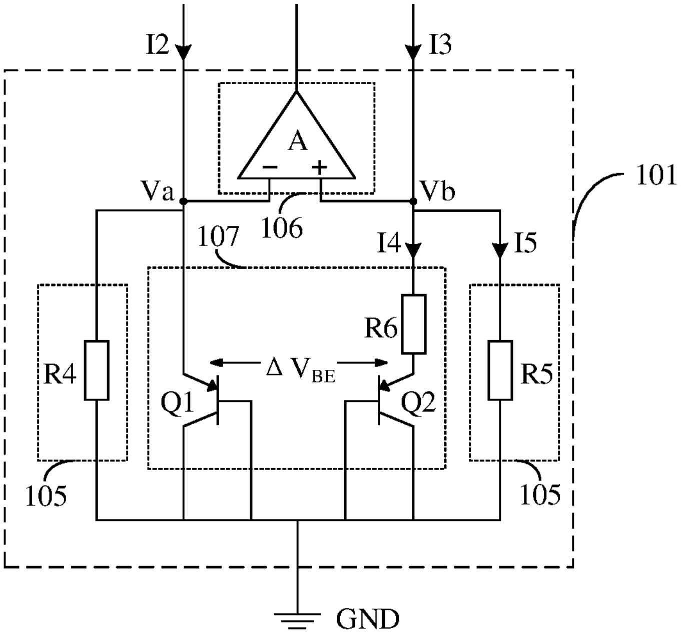
FIG. 5 is a fifth structural diagram of a bandgap voltage reference core circuit provided by an embodiment of the present disclosure.

In some embodiments of the present disclosure, as shown in FIG. 5, the voltage limiting circuit 106 may include: an operational amplifier A; the current dividing circuit 105 may include: a fourth resistor R4 and a fifth resistor R5; the voltage generating circuit 107 may include: a first BJT Q1, at least one second BJT Q2 and a sixth resistor R6.

A first end of the fourth resistor R4 is connected to the anti-phase input terminal of the operational amplifier A, a first end of the fifth resistor R5 is connected to the in-phase input terminal of the operational amplifier A, and a second end of the fourth resistor R4 and a second end of the fifth resistor R5 are both connected to the ground end GND.

The emitter of the first BJT Q1 is connected to the anti-phase input terminal of the operational amplifier A, and the emitter of at least one second BJT Q2 is connected to the in-phase input terminal of the operational amplifier A via the sixth resistor R6. The base and collector of the first BJT Q1, and the base and collector of at least one second BJT Q2 are all connected to the ground end GND.

The anti-phase input terminal of the operational amplifier A provides the first clamping voltage Va, and the in-phase input terminal of the operational amplifier A provides the second clamping voltage Vb. The emitter of the first BJT Q1 receives the first clamping voltage Va, and the emitter of at least one second BJT Q2 receives the second clamping voltage Vb. The first BJT Q1 and at least one second BJT Q2 may generate the positive temperature coefficient voltage $\Delta V_{BE}$ based on the first clamping voltage Va and the second clamping voltage Vb. The positive temperature coefficient voltage $\Delta V_{BE}$ is applied to two ends of the sixth resistor R6. The first BJT Q1 may also generate the negative temperature coefficient voltage $V_{BE}$ based on the first clamping voltage Va. $V_{BE}$ is the base-emitter voltage of the first BJT Q1 and applied to two ends of the fourth resistor R4.

It is to be noted that the first BJT Q1 and at least one second BJT Q2 shown in FIG. 5 are both PNP BJT. Both the first BJT and at least one second BJT may also be NPN BJT, and the bandgap voltage reference core circuit may be adjusted and transformed accordingly, for example, the object connected to the emitter of the PNP BJT is connected to the collector of the NPN BJT, and the object connected to the collector of the PNP BJT is connected to the emitter of the NPN BJT. The above transformations should fall within the scope of protection of the present disclosure.

Figure 6:
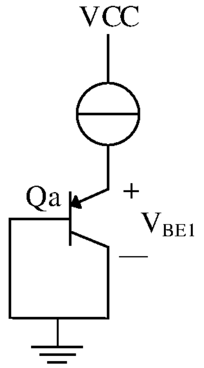
FIG. 6 is a first analysis diagram of a bandgap voltage reference core circuit provided by an embodiment of the present disclosure.

It is to be noted that the BJT may generate a temperature-dependent voltage. Taking a single BJT as an example, as shown in FIG. 6, the emitter of the BJT Qa is connected to the VCC, and the base and collector are both grounded. For the BJT Qa, the following formulas are satisfied:

$$I_C = I_S e^{V_{BE1}/V_T} \tag{3}$$

$$I_S = bT^{4+m} e^{-E_g/kT} \tag{4}$$

$$\frac{\partial V_{BE1}}{\partial T} = \frac{V_{BE1} - (4+m)V_T - E_g/q}{T} < 0. \tag{5}$$

In above formulas (3), (4) and (5), $V_{BE1}$ is the base-emitter voltage of the BJT Qa, T is the ambient temperature, VT is the positive temperature coefficient voltage, $I_C$ is the collector current of the BJT Qa, $I_S$ is the saturation current of the BJT Qa, $E_g$ equal to 1.12 eV is the forbidden bandwidth of the BJT Qa, q is the quantity of electric charge, and the remaining values are constants. $V_T$ is the positive temperature coefficient voltage, satisfying:

$$V_T = \frac{kT}{q}; \tag{6}$$

$$\frac{\partial VT}{\partial T} = \frac{k}{q} \approx 0.086 \text{ mV/K} > 0. \tag{7}$$

Depending on different conditions, $V_{BE1}$ may be the positive temperature coefficient voltage or the negative temperature coefficient voltage. For example, when m is −1.5, $V_{BE1}$ is 750 mV, and T is 300 K, the temperature coefficient $$\frac{\partial V_{BE1}}{\partial T}$$

of $V_{BE1}$ is about −1.5 mV/K, that is, in this case, $V_{BE1}$ is the negative temperature coefficient voltage.

Figure 7:
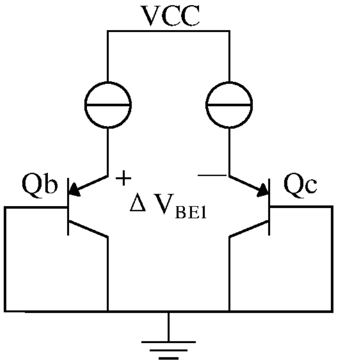
FIG. 7 is a second analysis diagram of a bandgap voltage reference core circuit provided by an embodiment of the present disclosure.

When multiple BJTs act together, as shown in FIG. 7, the emitters of the BJT Qb and the BJT Qc are connected to the VCC, the bases and collectors are grounded, and $\Delta V_{BE1}$ is a voltage difference between the emitter of the BJT Qb and the emitter of the BJT Qc. The following formula is satisfied:

$$\Delta V_{BE1} = V_{BE2} - V_{BE3} = V_T \ln(I_{C2}/I_{ES2}) - V_T \ln(I_{C3}/I_{ES3}) = V_T \ln\left(\frac{I_{C2}}{I_{C3}} \cdot \frac{I_{ES3}}{I_{ES2}}\right) = \alpha \cdot V_T. \tag{8}$$

In above formula (8), $V_{BE2}$ and $V_{BE3}$ are respectively the base-emitter voltages of the BJT Qb and the BJT Qc, T is the ambient temperature, $V_T$ is the positive temperature coefficient voltage, $I_{C2}$ and $I_{C3}$ are respectively the collector currents of the BJT Qb and the BJT Qc, and $I_{ES2}$ and $I_{ES3}$ are respectively the saturation currents of the BJT Qb and the BJT Qc.

Then, the coefficient α of $\Delta V_{BE1}$ and $V_T$ can be obtained as follows:

$$\alpha = \ln\left(\frac{I_{C2}}{I_{C3}} \cdot \frac{I_{ES3}}{I_{ES2}}\right). \tag{9}$$

It can be seen from the above formula (9) that when $$\frac{I_{C2}}{I_{C3}} \cdot \frac{I_{ES3}}{I_{ES2}} > 1,$$

and α>0, $\Delta V_{BE1}$ is the positive temperature coefficient voltage. That is, the positive temperature coefficient voltage $\Delta V_{BE1}$ can be generated by controlling the electrical characteristics of the BJT Qb and the BJT Qc.

In the embodiments of the present disclosure, combined with the derivation process of above formulas (3) to (9), referring to FIG. 5, the electrical characteristics of the first BJT Q1 and at least one second BJT Q2 are controlled so that the voltage difference $\Delta V_{BE}$ between their transmitters is a positive temperature coefficient voltage. Because Va is equal to Vb, the voltage difference between two ends of the sixth resistor R6 is also $\Delta V_{BE}$, that is, the positive temperature coefficient voltage $\Delta V_{BE}$ is applied to two ends of the sixth resistor R6.

Meanwhile, the correlated conditions of Q1 are controlled so that its base-emitter voltage $V_{BE}$ is a negative temperature coefficient voltage. Then the negative temperature coefficient voltage $V_{BE}$ is applied to two ends of the fourth resistor R4. Because Va is equal to Vb, the $V_{BE}$ is also applied to two ends of the fifth resistor R5.

Therefore, I4=$\Delta V_{BE}$/R6, I5=$V_{BE}$/R5, I3=I4+I5=($\Delta V_{BE}$/R6+$V_{BE}$/R5).

In the embodiments of the present disclosure, a ratio of a number of the first BJTs Q1 to a number of the at least one second BJT Q2 is 1:N, where N is greater than or equal to 1. The emitters of the N second BJTs Q2 are all connected to the in-phase input terminal of the operational amplifier A via the sixth resistor R6, and the bases and collectors of the N second BJTs Q2 are all connected to the ground end GND. Or, the number of at least one second BJT Q2 is 1, and a ratio of a cross-sectional area of an emitter of the first BJT Q1 to a cross-sectional area of an emitter of the at least one second BJT Q2 is 1:N, where N is greater than and equal to 1. In these two cases, $\Delta V_{BE}$ may be expressed as 1 nN*$V_T$, where $V_T$ is the positive temperature coefficient voltage; then, the current I3 satisfies the following formula:

$$I3 = \left(\frac{\ln N * V_T}{R6} + \frac{V_{BE}}{R5}\right). \tag{10}$$

It is understandable that by controlling the first BJT Q1, at least one second BJT Q2, the sixth resistor R6, the fourth resistor R4 and the fifth resistor R5, the positive temperature coefficient voltage $\Delta V_{BE}$ and the negative temperature coefficient voltage $V_{BE}$ can be controlled, and then the current I3 can be controlled. And I3 affects the initial current I3, and then affects the output reference voltage Vref. In this way, the output reference voltage can be adjusted so that the reference voltage is not limited to 1.2 V. Compared with the traditional bandgap voltage reference source, the reference voltage output by the embodiments of the present disclosure is greater than 1.2 V, which expands the range of the output reference voltage, that is, expands the range of use of the bandgap voltage reference source.

Figure 8:
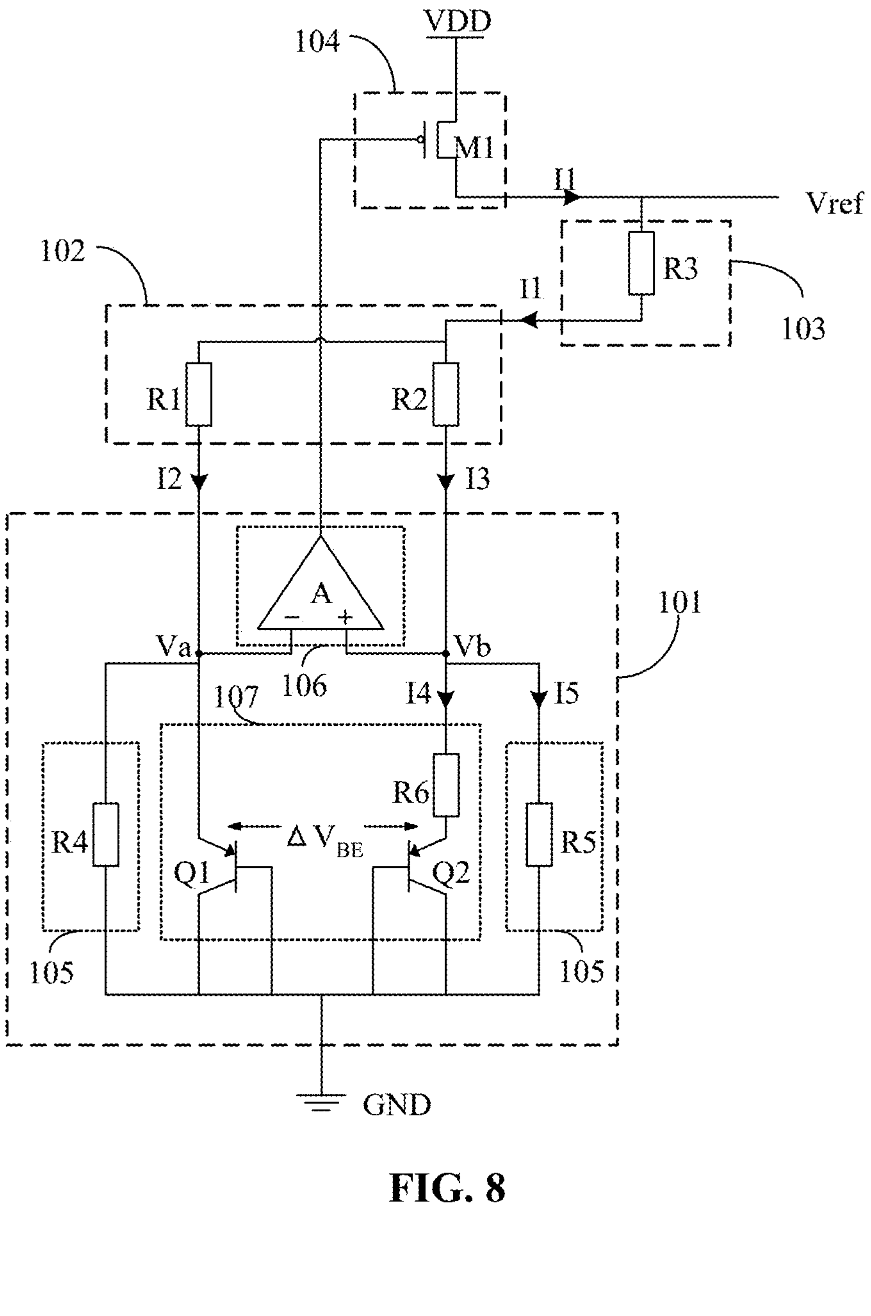
FIG. 8 is a sixth structural diagram of a bandgap voltage reference core circuit provided by an embodiment of the present disclosure.

In some embodiments of the present disclosure, as shown in FIG. 8, the second end of the first resistor R1 is connected to the anti-phase input terminal of the operational amplifier A and is connected to the first end of the fourth resistor R4 and the emitter of the first BJT Q1 to transmit the current I2. The second end of the second resistor R2 is connected to the in-phase input terminal of the operational amplifier A and is connected to a first end of the sixth resistor R6 and the first end of the fifth resistor R5 to transmit the current I3. The second source/drain of the MOSFET M1 is connected to the first end of the third resistor R3 to transmit the initial current I1. The resistance values of the first resistor R1 and the second resistor R2 are equal.

In the embodiments of the present disclosure, referring to above formulas (1), (2) and (10), $$Vref = V0 + I3 * R2 + I1 * R3 = V_{BE} + I3 * R2 + 2I3 * R3 = V_{BE} + \left(\frac{\ln N * V_T}{R6} + \frac{V_{BE}}{R5}\right) * (R2 + 2R3). \tag{11}$$

By simplifying above formula (11), the following formula can be obtained:

$$Vref = \left[V_{BE} + \frac{\ln N * V_T}{R6} * \frac{(2R3 + R2) * R5}{2R3 + R2 + R5}\right] * \frac{2R3 + R2 + R5}{R5}. \tag{12}$$

In above formula (12), $V_T$ is the positive temperature coefficient voltage, and $V_{BE}$ is the negative temperature coefficient voltage, which can cancel each other out by adjusting the values of $V_T$ and $V_{BE}$, and then the Vref with the first-order zero temperature drift coefficient is obtained.

In the embodiments of the present disclosure, by controlling the first BJT Q1 and at least one second BJT Q2, the negative temperature coefficient voltage $V_{BE}$ and the positive temperature coefficient voltage 1 nN*$V_T$ can be controlled; by controlling the resistance values of the first resistor R1 to the fifth resistor R5, other coefficients in the formula can be controlled. In this way, the adjustment of the reference voltage Vref is completed.

It is understandable that by controlling each device, the positive temperature coefficient voltage and the negative temperature coefficient voltage can cancel each other out, and the reference voltage Vref with the first-order zero temperature drift coefficient is output. Meanwhile, by controlling each device, the output reference voltage can be adjusted, so that it not limited to 1.2 V. Compared with the traditional bandgap voltage reference source, the reference voltage output by the embodiments of the present disclosure is greater than 1.2 V, which expands the range of the output reference voltage, that is, expands the range of use of the bandgap voltage reference source.

Figure 9:
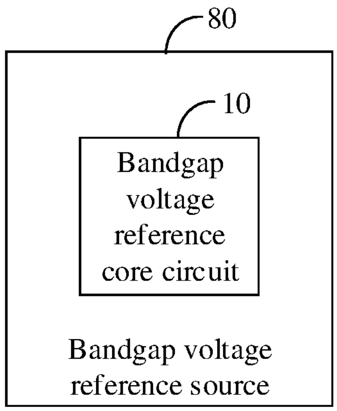
FIG. 9 is a structural diagram of a bandgap voltage reference source provided by an embodiment of the present disclosure.

The embodiments of the present disclosure also provide a bandgap voltage reference source 80. As shown in FIG. 9, the bandgap voltage reference source 80 may include the bandgap voltage reference core circuit 10 in the above embodiment, thus the output reference voltage is not limited to 1.2 V. Compared with the traditional bandgap voltage reference source, the reference voltage output by the bandgap voltage reference source 80 is greater than 1.2 V, so it has a larger range of use and can be used in a case where an output voltage greater than 1.2 V is required.

Figure 10:
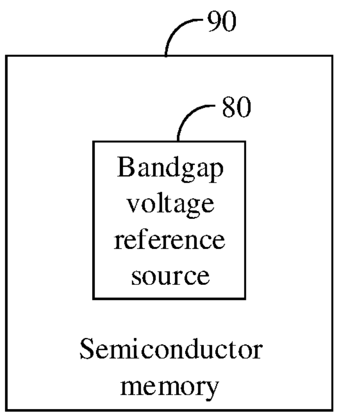
FIG. 10 is a structural diagram of a semiconductor memory provided by an embodiment of the present disclosure.

The embodiments of the present disclosure also provide a semiconductor memory 90. As shown in FIG. 10, the semiconductor memory 90 may include the bandgap voltage reference source 80.

In some embodiments of the present disclosure, the semiconductor memory 90 shown in FIG. 10 includes at least a DRAM.

It is to be noted that terms "include" and "contain" or any other variant in the present disclosure is intended to cover nonexclusive inclusions herein, so that a process, method, object or device including a series of components not only includes those components but also includes other components which are not clearly listed or further includes components intrinsic to the process, the method, the object or the device. Under the condition of no more limitations, a component defined by the statement "including a/an . . . " does not exclude existence of the same other components in a process, method, object or device including the component.

The sequence numbers of the embodiments of the present disclosure are adopted not to represent superiority-inferiority of the embodiments but only for description. The methods disclosed in some method embodiments provided in the present disclosure may be freely combined without conflicts to obtain new method embodiments. The characteristics disclosed in some product embodiments provided in the present disclosure may be freely combined without conflicts to obtain new product embodiments. The characteristics disclosed in some method or device embodiments provided in the present disclosure may be freely combined without conflicts to obtain new method embodiments or device embodiments.

The above is only the specific implementation modes of the disclosure and not intended to limit the protection scope of the disclosure; any change or replacement that those skilled in the art can think of easily in the scope of technologies disclosed by the disclosure shall fall within the protection scope of the disclosure. Therefore, the scope of protection of the present disclosure shall be subject to the scope of protection of the claims.

The invention claimed is:

1. A bandgap voltage reference core circuit, comprising: a generating circuit, a first voltage dividing circuit and a second voltage dividing circuit, wherein the generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage;

the first voltage dividing circuit is connected to the generating circuit and the second voltage dividing circuit respectively, and is configured to generate an initial current based on the positive temperature coefficient current and the negative temperature coefficient current; and the second voltage dividing circuit is configured to determine a reference voltage based on the initial current, wherein the first voltage dividing circuit and the second voltage dividing circuit affect a voltage dividing proportion of the reference voltage, and the reference voltage has a first-order zero temperature drift coefficient;

wherein the generating circuit comprises: a voltage limiting circuit, a voltage generating circuit and a current dividing circuit; and the voltage generating circuit and the current dividing circuit are both connected to the voltage limiting circuit, wherein the voltage limiting circuit is configured to provide a first clamping voltage and a second clamping voltage, the first clamping voltage being equal to the second clamping voltage;

the voltage generating circuit is configured to generate the positive temperature coefficient voltage and the negative temperature coefficient voltage based on the first clamping voltage and the second clamping voltage, and obtain the positive temperature coefficient current based on the positive temperature coefficient voltage; and the current dividing circuit is configured to obtain the negative temperature coefficient current based on the negative temperature coefficient voltage; the current dividing circuit comprises: a fourth resistor and a fifth resistor, the fourth resistor is connected to the voltage limiting circuit, the fifth resistor is connected to the voltage limiting circuit; the fourth resistor and the fifth resistor are used to adjust the range of the reference voltage.

2. The bandgap voltage reference core circuit of claim 1, wherein the first voltage dividing circuit comprises: a first resistor and a second resistor, wherein a first end of the first resistor is connected to a first end of the second resistor; and a second end of the first resistor and a second end of the second resistor are respectively connected to the generating circuit.

3. The bandgap voltage reference core circuit of claim 2, wherein a ratio of a resistance value of the first resistor to a resistance value of the second resistor is 1:1.

4. The bandgap voltage reference core circuit of claim 2, further comprising: a current source, the current source comprising: a Metal-Oxide-Semiconductor Field-Effect Transistor (MOSFET), wherein a gate of the MOSFET is connected to the generating circuit;

a first source/drain of the MOSFET is connected to a power end; and the first end of the first resistor and the first end of the second resistor are connected to a second source/drain of the MOSFET via the second voltage dividing circuit.

5. The bandgap voltage reference core circuit of claim 4, wherein the second voltage dividing circuit comprises: a third resistor, wherein a first end of the third resistor is connected to the second source/drain of the MOSFET; and the first end of the first resistor and the first end of the second resistor are both connected to a second end of the third resistor.

6. The bandgap voltage reference core circuit of claim 1, wherein the voltage limiting circuit comprises: an operational amplifier, wherein an anti-phase input terminal of the operational amplifier provides the first clamping voltage; and an in-phase input terminal of the operational amplifier provides the second clamping voltage.

7. The bandgap voltage reference core circuit of claim 6, wherein a first end of the fourth resistor is connected to the anti-phase input terminal of the operational amplifier;

a first end of the fifth resistor is connected to the in-phase input terminal of the operational amplifier; and a second end of the fourth resistor and a second end of the fifth resistor are both connected to a ground end.

8. The bandgap voltage reference core circuit of claim 6, wherein the voltage generating circuit comprises: a sixth resistor, wherein a first end of the sixth resistor is connected to the in-phase input terminal of the operational amplifier.

9. The bandgap voltage reference core circuit of claim 8, wherein the voltage generating circuit further comprises: a first Bipolar Junction Transistor (BJT) and at least one second BJT, wherein the first BJT and the at least one second BJT are configured to generate the positive temperature coefficient voltage based on the first clamping voltage and the second clamping voltage, and the positive temperature coefficient voltage is applied to two ends of the sixth resistor; and the first BJT is further configured to generate the negative temperature coefficient voltage based on the first clamping voltage.

10. The bandgap voltage reference core circuit of claim 9, wherein:

a first terminal of the first BJT is connected to the anti-phase input terminal of the operational amplifier to receive the first clamping voltage, and a first terminal of the at least one second BJT is connected to the in-phase input terminal of the operational amplifier via the sixth resistor to receive the second clamping voltage, the first terminal being an emitter or a collector; and a base and a second terminal of the first BJT and a base and a second terminal of the at least one second BJT are all connected to a ground end, the second terminal being the collector or the emitter.

11. The bandgap voltage reference core circuit of claim 10, wherein a ratio of the number of the first Bipolar Junction Transistors (BJTs) to the number of the at least one second BJT is 1:N, where N is greater than or equal to 1.

12. The bandgap voltage reference core circuit of claim 9, wherein a number of the at least one second BJT is 1; a ratio of a cross-sectional area of an emitter of the first BJT to a cross-sectional area of an emitter of the at least one second BJT is 1:N, where N is greater than and equal to 1.

13. A bandgap voltage reference source, comprising a bandgap voltage reference core circuit that comprises a generating circuit, a first voltage dividing circuit and a second voltage dividing circuit, wherein the generating circuit is configured to generate a positive temperature coefficient voltage and a negative temperature coefficient voltage, and obtain a positive temperature coefficient current and a negative temperature coefficient current based on the positive temperature coefficient voltage and the negative temperature coefficient voltage;

the first voltage dividing circuit is connected to the generating circuit and the second voltage dividing circuit respectively, and is configured to generate an initial current based on the positive temperature coefficient current and the negative temperature coefficient current; and the second voltage dividing circuit is configured to determine a reference voltage based on the initial current, wherein the first voltage dividing circuit and the second voltage dividing circuit affect a voltage dividing proportion of the reference voltage, and the reference voltage has a first-order zero temperature drift coefficient;

wherein the generating circuit comprises: a voltage limiting circuit, a voltage generating circuit and a current dividing circuit; and the voltage generating circuit and the current dividing circuit are both connected to the voltage limiting circuit, wherein the voltage limiting circuit is configured to provide a first clamping voltage and a second clamping voltage, the first clamping voltage being equal to the second clamping voltage;

the voltage generating circuit is configured to generate the positive temperature coefficient voltage and the negative temperature coefficient voltage based on the first clamping voltage and the second clamping voltage, and obtain the positive temperature coefficient current based on the positive temperature coefficient voltage; and the current dividing circuit is configured to obtain the negative temperature coefficient current based on the negative temperature coefficient voltage; the current dividing circuit comprises: a fourth resistor and a fifth resistor, the fourth resistor is connected to the voltage limiting circuit, the fifth resistor is connected to the voltage limiting circuit; the fourth resistor and fifth resistor are used to adjust the range of the reference voltage.

14. A semiconductor memory, comprising the bandgap voltage reference source of claim 13.

15. The semiconductor memory of claim 14, at least comprising a Dynamic Random Access Memory (DRAM).

* * * * *